(12) United States Patent
Zhang et al.

(10) Patent No.: US 12,744,465 B2
(45) Date of Patent: Sep. 22, 2026

(54) SOFT SWITCH CONTROL CIRCUIT OF FLYBACK CONVERTER AND FLYBACK CONVERTER APPLYING THE SAME

(71) Applicant: Joulwatt Technology Co., Ltd., Hangzhou (CN)

(72) Inventors: Junming Zhang, Hangzhou (CN); Xianghua Jiang, Hangzhou (CN); Xiangyong Xu, Hangzhou (CN); Pitleong Wong, Hangzhou (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 62 days.

(21) Appl. No.: 18/527,231

(22) Filed: Dec. 1, 2023

(65) Prior Publication Data

US 2024/0186909 A1 Jun. 6, 2024

(30) Foreign Application Priority Data

Dec. 1, 2022 (CN) ......................... 202211531928.3

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05); *H02M 3/33571* (2021.05)

(58) Field of Classification Search
CPC ........... H02M 3/33592; H02M 1/0058; H02M 3/33571; H02M 1/342; H02M 1/08; H02M 1/083; H02M 1/088
See application file for complete search history.

(56) References Cited

U.S. PATENT DOCUMENTS

2022/0140743 A1* 5/2022 Su ..................... H02M 3/33592 363/21.06
2022/0376629 A1* 11/2022 Xu ...................... H02M 1/0058

FOREIGN PATENT DOCUMENTS

CN 109067191 12/2018
CN 112701882 4/2021

* cited by examiner

*Primary Examiner* — Kyle J Moody
(74) *Attorney, Agent, or Firm* — Treasure IP Group, LLC

(57) ABSTRACT

Disclosed is a soft switch control circuit and a flyback converter, comprising a primary edge part and a secondary edge part, and obtaining a trigger pulse signal according to a pre-turning on signal of a main switch transistor before the main switch transistor is turned on. The trigger pulse signal is transmitted to the secondary edge part by an isolation module to control the switch at a secondary edge circuit to conduct, to reduce source-drain voltage of the main switch circuit of the primary edge, to make the main switch transistor to turn on when the source-drain voltage is near zero voltage. The switch of the secondary edge circuit is a synchronous rectifying switch transistor or a discharge switch transistor connected at two ends of the synchronous rectifying switch transistor.

26 Claims, 7 Drawing Sheets

Vg1
Vg2
Vg4
Vg3
$V_{sw}$
$i_{Lm}$
t
t1 t2 t3 t4 t5 t6

SOFT SWITCH CONTROL CIRCUIT OF FLYBACK CONVERTER AND FLYBACK CONVERTER APPLYING THE SAME

CROSS-REFERENCE TO RELATED APPLICATION

This application claims priority to Chinese patent application No. 202211531928.3, filed on Dec. 1, 2022, and entitled "SOFT SWITCH CONTROL CIRCUIT OF FLYBACK CONVERTER AND FLYBACK CONVERTER APPLYING THE SAME", the entire contents of which are incorporated by reference.

FIELD OF THE DISCLOSURE

The present disclosure relates to the field of power electronics technology, more particularly, to a soft switch control circuit of a flyback converter and a flyback converter applying the same.

DESCRIPTION OF THE RELATED ART

In the flyback converter, the flyback converter comprises a transformer; the transformer usually comprises a primary edge winding and a secondary edge winding; the primary edge winding is for connecting to the input of the flyback converter, while the secondary edge winding is for connecting to the output of the flyback converter, wherein the primary edge winding comprises an excitation inductance coil and a transformer primary edge coil.

In some application scenarios of the flyback converter, the primary edge part further comprises a first capacitor and a first inductor connected to the excitation inductance; the first inductor may be a leakage inductor of the transformer, and it forms an active clamp flyback converter or a non-symmetric half-bridge flyback converter together with the switch transistor of the primary edge; the secondary edge part further comprises a rectifying switch transistor connected to the secondary edge winding; FIGS. 1*a* and 1*b* are circuit diagrams of a non-symmetric half-bridge flyback converter, and the work principles of the two circuits are substantially the same. The difference lies in that an upper switch transistor or a lower switch transistor is used as a main switch transistor, while the other is used as an auxiliary switch transistor; the switch transistor connected in series with the excitation inductance, the first capacitor, and the first inductor is marked as the auxiliary switch transistor; here the primary edge upper switch transistor and the lower switch transistor are transistors, and the secondary edge rectifying transistor is a synchronous rectifying switch transistor. Compared with the conventional flyback converter, the non-symmetric half-bridge flyback converter has higher efficiency, and when it is in heavy load, it usually works at the state that two working transistors are complementary, while in light load, it usually uses the manner of reducing switch frequency, to make the flyback converter enter into the DCM (discontinuous conduction mode); however, in the DCM, since the hard turning-on of the main switch transistor will bring big turning-on consumption, the higher the switch frequency, the bigger the consumption.

Therefore, it is necessary to provide an improved technical solution to overcome the above technical problem in the prior art.

SUMMARY OF THE INVENTION

In view of this, the objective the present invention is provide a soft switch control circuit of a non-symmetric half-bridge flyback converter and a control method, to resolve the technical problem in the prior art that in the DCM, the hard turning-on of the main switch transistor will bring big turning-on consumption.

In a first aspect, the present invention provides a soft switch control circuit of a flyback converter, the flyback converter comprising a primary edge part and a secondary edge part; the primary edge part comprises a main switch transistor, and the secondary edge part comprises a synchronous rectifying switch transistor; the control circuit comprise a switch control module for controlling the main switch transistor to conduct at a first time period and the synchronous rectifying switch transistor to conduct at a second time period, and for controlling the switch transistor set at the secondary edge circuit to conduct at a third time period, the third time period being after the second time period and before the first time period; wherein the switch control module comprises a primary edge control module, and the primary edge control module obtains a trigger pulse signal according to the pre-turning on signal of the main switch transistor, and the trigger pulse signal is transmitted to the secondary edge part by the isolation module, to control the switch transistor of the secondary edge circuit to conduct at the third time period.

Preferably, the primary edge control module comprises a pulse circuit, and the pulse circuit obtains the trigger pulse signal according to the pre-turning on signal of the main switch transistor.

Preferably, the isolation module is one of an isolation transformer, an isolation optocoupler, or an isolation capacitor.

Preferably, the flyback converter further comprises a transformer formed of a primary edge winding and a secondary edge winding; the primary edge part comprises the primary edge winding and the secondary edge part comprises the secondary edge winding, and the transformer is used as the isolation module.

Preferably, the primary edge control module further comprises a conduction delay circuit; the conduction delay circuit is connected to the pulse circuit so as to control the main switch transistor to turn off within the third time period that the switch transistor of the secondary edge circuit is conducted.

Preferably, the switch transistor set at the secondary edge circuit is the synchronous rectifying switch transistor or a discharge switch transistor connected to the two ends of the synchronous rectifying switch transistor.

Preferably, the switch control module further comprises a secondary edge control module; the primary edge control module comprises a primary edge control circuit and a primary edge driver, the primary edge control circuit generates a switch control signal of the main switch transistor, and the primary edge driver drives the main switch transistor to turn on/off according to the switch control signal; the secondary edge control module comprises a secondary edge control circuit and a secondary edge driver; the secondary edge control circuit generates the switch control signal of the synchronous rectifying switch transistor, and the secondary edge driver drives the synchronous rectifying switch transistor to turn on/off according to the switch control signal; the pulse circuit transmits the trigger pulse signal to the isolation module, and the secondary edge control circuit receives the signal transmitted by the isolation module, to control the synchronous rectifying switch transistor or the discharge switch transistor connected at the two ends of the synchronous rectifying switch transistor to conduct at the third time period.

Preferably, the switch control module further comprises a secondary edge control module; the primary edge control module comprises a primary and secondary edge control circuit and a primary edge driver; the primary and secondary edge control circuit generates a switch control signal of the main switch transistor and a switch control signal of the synchronous rectifying switch transistor, and the primary edge driver drives the main switch transistor to turn on/off according to the switch control signal of the main switch transistor; the secondary edge control module comprises a secondary edge driver; the primary and secondary edge control circuit transmits the switch control signal of the synchronous rectifying switch transistor to the secondary edge driver by the isolation module, and the secondary edge driver drives the synchronous rectifying switch transistor to turn on/off according to the switch control signal of the synchronous rectifying switch transistor; the pulse circuit transmits the generated pulse trigger signal to the isolation module; the secondary edge driver receives the signal transmitted by the isolation module, to control the synchronous rectifying switch or the discharge switch transistor connected at two ends of the synchronous rectifying switch transistor to conduct at the third time period.

Preferably, during the valid time period of the trigger pulse signal, the switch transistor of the secondary edge circuit is controlled to conduct, and the valid time period of the trigger pulse signal is the third time period.

Preferably, the duration of the third time period is a preset value associated with the input voltage or the output voltage, or is self-adapted according to whether the main switch transistor is conducted when the source-drain voltage is zero.

Preferably, the primary edge part further comprises an auxiliary switch transistor, the auxiliary switch transistor being connected to the main switch transistor; the switch control module is for controlling the auxiliary switch transistor and the synchronous rectifying switch transistor to conduct at the second time period.

Preferably, the primary edge control module controls the auxiliary switch transistor to conduct at the second time period, and the primary edge control module transmits work instructions to control the synchronous rectifying switch transistor by the isolation module, to control the synchronous rectifying switch transistor to conduct synchronously at the second time period.

In the second aspect, there is provided a soft switch control circuit of a flyback converter, and the flyback converter comprises a primary edge part and a secondary edge part; the primary edge part comprises a main switch transistor, and the secondary edge part comprises a synchronous rectifying switch transistor; the control circuit comprises: a switch control module, for controlling the main switch transistor to conduct at a first time period and the synchronous rectifying switch transistor to conduct at a second time period, and controlling the switch transistor set at the secondary edge circuit to conduct at the third time period, the third time period being after the second time period and before the first time period, wherein the switch control module comprises a primary edge control module and a secondary edge control module, the primary edge control module generates a pre-turning on signal to control the main switch transistor to turn on, and the pre-turning on signal is transmitted to the secondary edge control module by an isolation module; the secondary edge control module obtains a trigger pulse signal according to the pre-turning on signal of the main switch transistor, to control the switch transistor of the secondary edge circuit to conduct at the third time period.

Preferably, the secondary edge control module comprises a pulse circuit, and the pulse circuit obtains the trigger pulse signal according to the pre-turning on signal of the main switch transistor.

Preferably, the isolation module is one of an isolation transformer, an isolation optocoupler, or an isolation capacitor.

Preferably, the synchronous rectifying switch transistor is controlled to conduct within the valid time period of the trigger pulse signal, the valid time of the trigger pulse signal being the third time period; the primary edge control module controls the main switch transistor to turn off when the trigger pulse signal is in a valid state.

Preferably, the switch transistor set at the secondary edge circuit is the synchronous rectifying switch transistor or a discharge switch transistor connected at two ends of the synchronous rectifying switch transistor.

Preferably, the primary edge control module comprises a primary edge control circuit and a primary edge driver; the primary edge control circuit generates a switch control signal of the main switch transistor, and the primary edge driver drives the main switch transistor to turn on/off according to the switch control signal; the secondary edge control module comprises a secondary edge control circuit and a secondary edge driver, the secondary edge control circuit generating a switch control signal of the synchronous rectifying switch transistor, the secondary edge driver driving the synchronous rectifying switch transistor to turn on/off according to the switch control signal; the secondary edge control circuit comprises the pulse signal, the pulse circuit receiving the pre-turning on signal transmitted by the isolation module, to generate the trigger pulse signal to control the synchronous rectifying switch transistor or the discharge switch transistor connected at two ends of the synchronous rectifying switch transistor to conduct at the third time period.

Preferably, the primary edge part further comprises an auxiliary switch transistor, the auxiliary switch transistor being connected to the main switch transistor; the switch control module is for controlling the auxiliary switch transistor and the synchronous rectifying switch transistor to conduct at the second time period.

The primary edge control module controls the auxiliary switch transistor to conduct at the second time period, and the primary edge control module transmits the work instructions to control the synchronous rectifying switch transistor by the isolation module, to control the synchronous rectifying switch transistor to conduct synchronously at the second time period.

In a third aspect, there is provided a flyback converter, and the flyback converter comprises a primary edge part and a secondary edge part; the primary edge part comprises a main switch transistor and the secondary edge part comprises a synchronous rectifying switch transistor, wherein comprising: the above soft switch control circuit, and the soft switch control circuit is for controlling a switch state of the main switch transistor and the synchronous rectifying switch transistor.

By using the circuit structure of the flyback converter of the present disclosure, in the DCM or the hiccup working mode, before the main switch transistor is turned on, a trigger pulse signal is obtained by detecting the pre-turning on signal of the main switch transistor; the trigger pulse signal is transmitted to the secondary edge through the isolation module, to control the synchronous rectifying switch transistor at the secondary edge and the discharge switch transistor connected to the two ends of the synchronous rectifying switch transistor to conduct, so as to reduce the source-drain voltage of the main switch transistor of the primary edge, to make the main switch transistor to conduct when the source-drain voltage is zero or close to zero. The solution of the present invention can solve the hard turning-on problem of the main switch transistor, to make the main switch conduct to conduct at zero voltage, so as to realize soft switch control, reduce the conduction consumption of the main switch transistor, and improve system efficiency.

DETAILED DESCRIPTION OF EMBODIMENTS OF THE DISCLOSURE

The following will describe in great detail the preferred embodiments of the present invention by combining with the accompanying drawings. However, the present invention is not restricted to these embodiments. The present invention covers any replacement, amendments, equivalent methods and solutions made within the scope and spirits of the present invention.

In order to make the public to have a thorough understanding of the present invention, details are provided in the following detailed description of the preferred embodiments of the present invention; however, those skilled in the art can totally understand the present invention without the descriptions of these details.

The present invention will be described in more details by way of illustration by referring to the accompanying drawings in the following paragraphs. It needs to explain that the accompanying drawings all use simplified forms and use non-accurate ratios, and are merely for helping to illustrate the embodiments of the present invention conveniently and clearly.

Figure 1A:
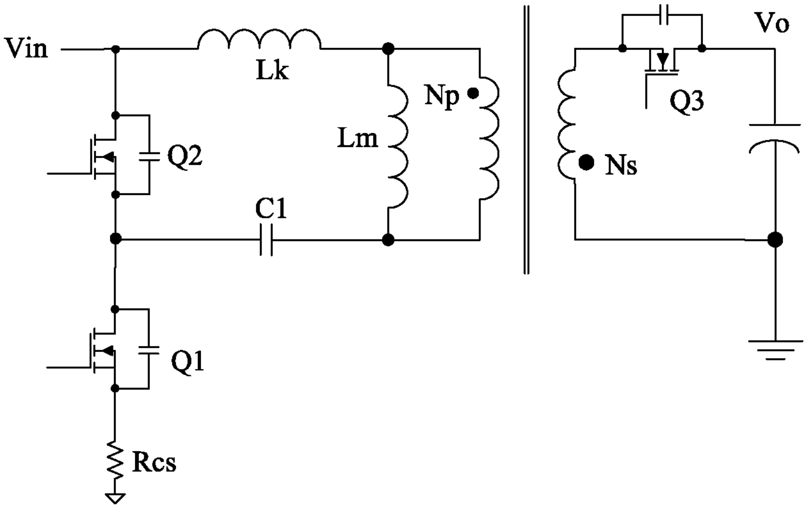
FIG. 1*a* is a circuit diagram of a first topology of the flyback converter.
Figure 1B:
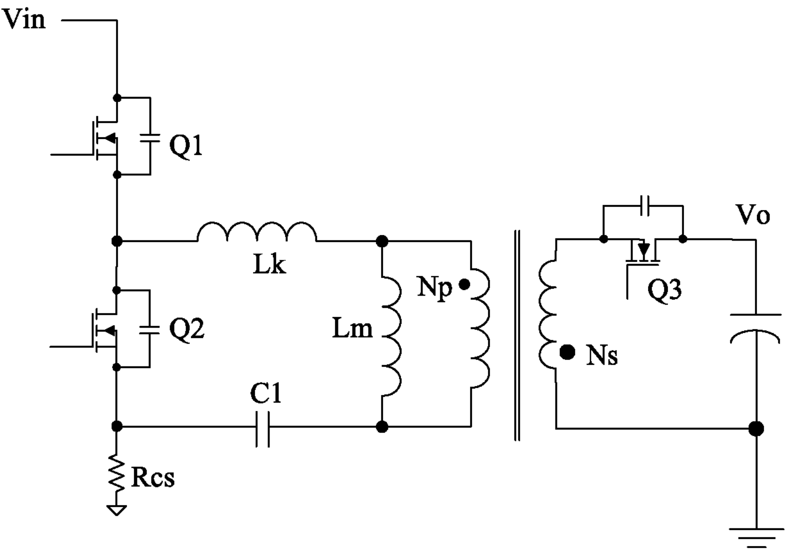
FIG. 1*b* is a circuit diagram of a second topology of the flyback converter.
Figure 2:
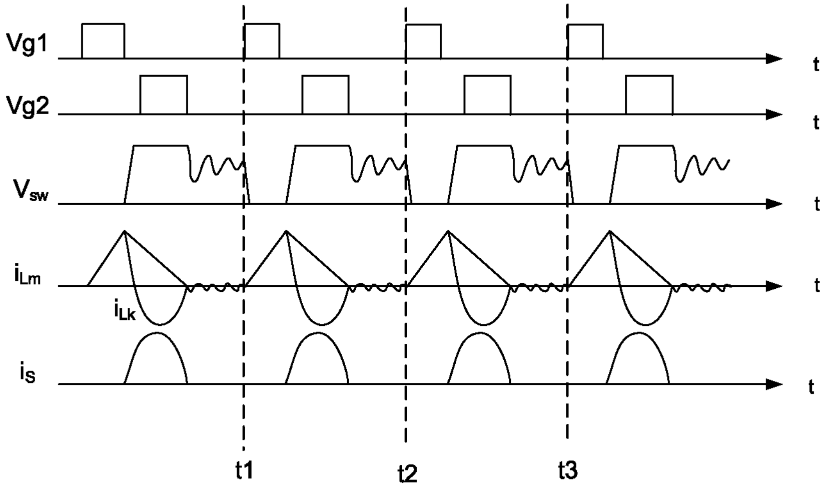
FIG. 2 is a prior art waveform diagram.
Figure 3:
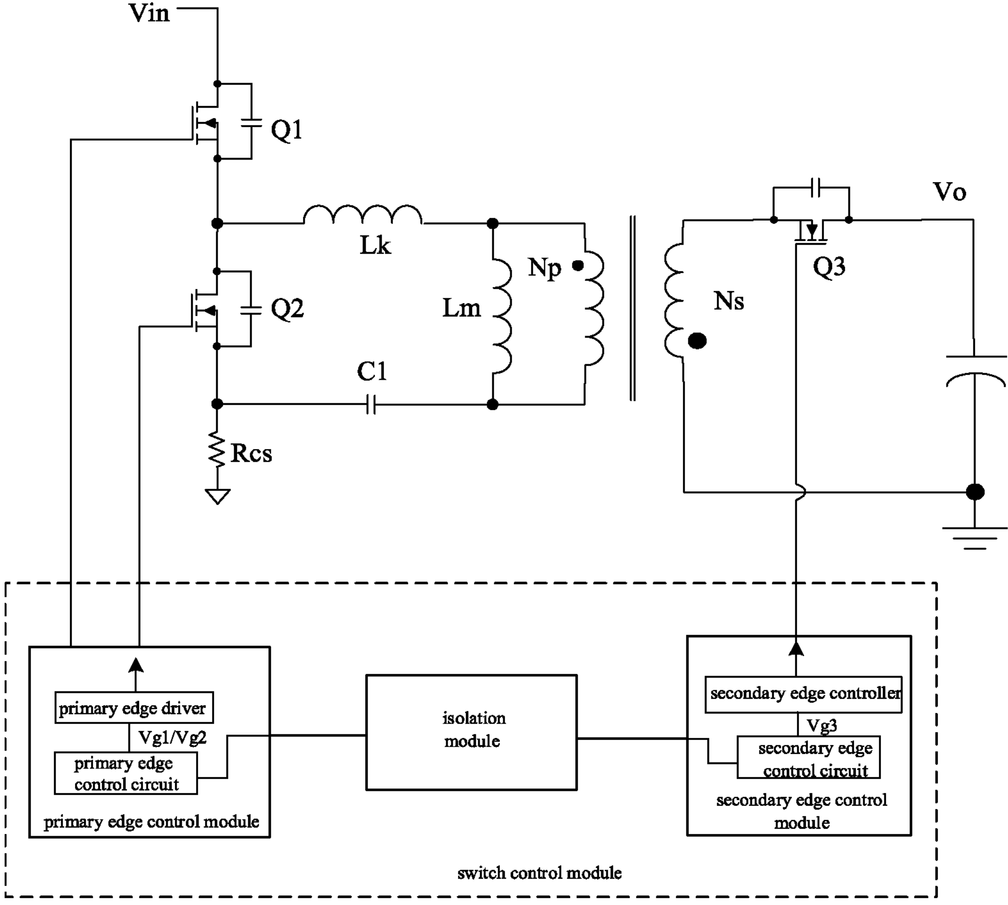
FIG. 3 is a circuit diagram of a first embodiment of the switch control module of the flyback converter of the present invention.
Figure 4:
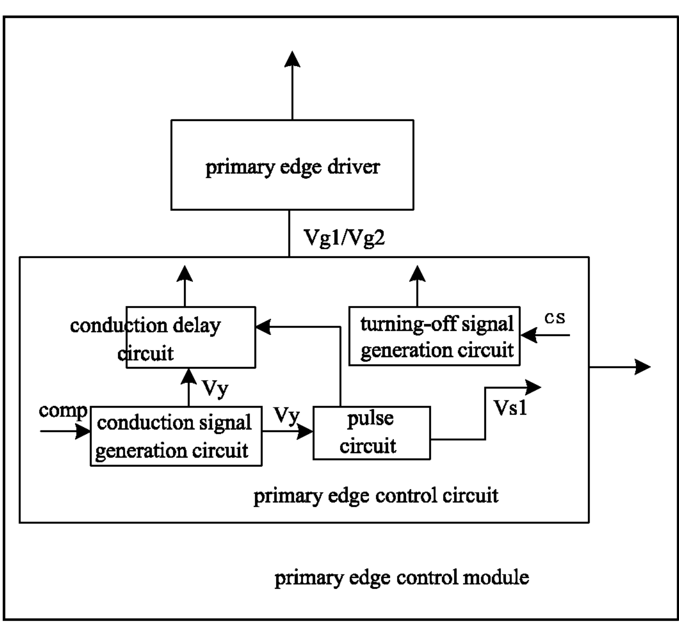
FIG. 4 is a circuit diagram of an embodiment of the primary edge control module in FIG. 3.

Refer to FIG. 3, it is a circuit diagram of the first embodiment of the soft switch control module of the flyback converter of the present invention, and FIG. 4 is an implementation of the primary edge control module in FIG. 3 of the present invention. FIG. 3 uses the second topology structure of the flyback converter of the present invention as an example to illustrate, and the control manner of the present invention also applies for the flyback converter of the first topology structure. As shown in FIGS. 3 and 4, in this disclosure, the flyback converter comprises a primary edge part and a secondary edge part; the primary edge part comprises a main switch transistor and an auxiliary switch transistor which are connected, while the secondary edge part comprises a synchronous rectifying switch transistor; the flyback converter further comprises a transformer formed of primary edge winding Np and auxiliary edge winding Ns, and the primary edge part further comprises a primary edge winding, a first capacitor C1, and a first inductor Lk; the secondary edge part further comprises a secondary edge winding; the main switch transistor is marked as Q1, and the auxiliary switch transistor is marked as Q2. In a possible embodiment, the first switch transistor Q1 and the second switch transistor Q2 are both NMOS field effect transistors, and the two are connected in series between the input voltage and the reference ground of the primary edge. In this embodiment, the first capacitor Cr is a resonant capacitor, and the first inductor may be the leakage inductor of the transformer; when the switch transistor Q2 is turned on, the first capacitor Cr and the first inductor work resonantly.

The secondary edge part of the flyback converter further comprises an output capacitor Co. The synchronous rectifying switch transistor is marked as Q3, and one end of the synchronous rectifying switch transistor is connected to the heteronymous end of the secondary edge winding Ns, while the other end of the synchronous rectifying switch transistor is connected to the output end of the flyback converter; the positive electrode of the output capacitor Co is connected to the output end of the flyback converter, and the negative electrode of the output capacitor Co is connected to the reference ground of the secondary edge; meanwhile, the homonymous end of the secondary edge winding Ns is also connected to the reference ground.

As shown in FIGS. 3 and 4, the switch control module is for controlling the main switch transistor to conduct at the first time period, and the auxiliary switch transistor and the synchronous rectifying switch transistor to conduct at the second time period, and controlling the switch transistor set at the secondary edge circuit to conduct at the third time period; the third time period is after the second time period and before the first time period; the time period that the auxiliary switch transistor and the synchronous rectifying switch transistor are conducted at the second time period is a continuous flow period of the flyback converter; in this embodiment, the switch transistor set at the secondary edge circuit is a synchronous rectifying switch transistor. In this embodiment, the switch control module comprises a primary edge control module and a secondary edge control module, and the primary edge control module obtains the trigger pulse signal Vs1 according to the pre-turning on signal of the main switch transistor; the trigger pulse signal is transmitted to the secondary edge control module through the isolation module, to control the synchronous rectifying switch transistor to conduct at the third time period.

Preferably, the primary edge control module comprises a primary edge control circuit and a primary edge driver, and the primary edge control circuit generates the switch control signal of the main switch transistor and the auxiliary switch transistor, wherein the switch control signal comprises a signal to control the main switch transistor to turn on/off, e.g., Vg1/Vg2, and a signal to control the auxiliary switch transistor to turn on/off; the primary edge driver drives the turning-on/off of the main switch transistor and the auxiliary switch transistor according to the switch control signal.

Specifically, the primary edge control module comprises a pulse circuit, and the pulse circuit obtains the trigger pulse signal according to the pre-turning on signal of the main switch transistor. Here, in the example shown in FIG. 4, the primary edge control circuit further comprises a conduction signal generation circuit and a turning-off signal generation circuit. The conduction signal generation circuit may generate a pre-turning on signal to control the main switch transistor according to the error compensation signal comp, e.g., Vy; the turning-off signal generation circuit may generate a turning-off signal to control the main switch transistor according to the sampling signal cs of the inductive current, and the conduction signal generation circuit and the turning-off signal generation circuit may be any proper circuit structures in the prior art, which is not illustrated in detail here. In this embodiment, the primary edge control module further comprises a conduction delay circuit, and the conduction delay circuit has circuit connection with the pulse circuit and the conduction signal, so as to control the main switch transistor not conduct during the third time period when the synchronous rectifying switch is conducted, i.e., keep turning-off when the pre-turning on signal is received, and it can formally turn on the main switch transistor when it detects that the source-drain voltage is reduced near zero voltage, to avoid the main switch transistor and the synchronous rectifying switch transistor to conduct simultaneously.

In this embodiment, the secondary edge control module comprises a secondary edge control circuit and a secondary edge driver, and the secondary edge control circuit generates the switch control signal Vg3 of the synchronous rectifying switch transistor, and the secondary edge driver drives the turning on/off of the synchronous rectifying switch according to the switch control signal; the secondary edge control circuit receives the signal transmitted by the isolation module, to control the synchronous rectifying switch transistor to conduct at the third time period. Here, the isolation module can directly transmit the original trigger pulse signal to the secondary edge control circuit, or it may also transmit the trigger pulse signal to the secondary edge control circuit after encoding and decoding it, and these can both realize the conduction control of the synchronous rectifying switch transistor; the secondary edge control circuit may also control the synchronous rectifying switch transistor to conduct after processing the trigger pulse signal.

In one example, the isolation module is one of an isolation transformer, an isolation optocoupler, or an isolation capacitor. In another example, the transformer is used as the isolation module.

Here, within the valid time period of the trigger pulse signal, the synchronous rectifying switch transistor is controlled to conduct and the valid time period of the trigger pulse signal is the third time period. In an alternative embodiment, the valid time period of the trigger pulse signal may also be inconsistent with the third time period, e.g., the secondary edge control module may obtain a final pulse signal according to the rising edge of the trigger pulse signal, and the final pulse signal valid time period is the third time period. Preferably, the duration of the third time period is a preset value associated with the input voltage or the output voltage, or is self-adapted according to whether the main switch transistor is conducted when the source-drain voltage is zero; for example, in the current work cycle, if the main switch transistor is not conducted at zero voltage, the duration of the third time period is increased or reduced, to make that the main switch transistor to conduct as much as possible at the next work cycle. The primary edge part and the secondary edge part may transmit other signals by the isolation module, e.g., the source-drain voltage information of the primary edge main switch transistor, and the duration of the third time period can be adjusted by the transmitting secondary edge.

By the embodiments of FIGS. 3 and 4, the trigger pulse signal is obtained by the primary edge control circuit. Since the conduction signal and the trigger pulse signal controlling the main switch transistor are both generated at the primary edge, the circuit control is convenient, and they are transmitted to the secondary edge part by the isolation module, and this does not affect the isolation work of the primary and secondary edge due to excellent isolation.

Still refer to FIG. 3, in another example, the switch control module is for controlling the main switch transistor to conduct at the first time period, and the secondary auxiliary transistor and the synchronous rectifying switch transistor to conduct at the second time period, and controlling the synchronous rectifying switch transistor to conduct at the third time period, the third time period being after the second time period and before the first time period, wherein the switch control module comprises a primary edge control module and a secondary edge control module. The primary edge control module generates the pre-turning on signal to control the main switch transistor to turn on, and the pre-turning on signal is transmitted to the secondary edge control module, and the secondary edge control module obtains the trigger pulse signal Vs1 according to the pre-turning on signal of the main switch transistor, to control the synchronous rectifying switch transistor to conduct at the third time period. In this example, the primary edge control module comprises a primary edge control circuit and a primary edge driver, and the primary edge control circuit generates the switch control signal, e.g., Vg1/Vg2, of the main switch transistor and the auxiliary switch transistor, and the primary edge driver drives the turning-on/off of the main switch transistor and the auxiliary switch transistor according to the switch control signal; the secondary edge control module comprises a secondary edge control circuit and a secondary edge driver, and the secondary edge control circuit generates a switch control signal of the synchronous rectifying switch transistor, e.g., Vg3, and the secondary edge driver drives the turning-on/off of the synchronous rectifying switch transistor according to the switch control signal; the secondary edge control circuit comprises a pulse circuit, and the pulse circuit receives the pre-turning on signal, e.g., Vy, transmitted by the isolation module, to generate the trigger pulse signal to control the synchronous rectifying switch transistor to conduct at the third time period.

Specifically, the secondary edge control module comprises a pulse circuit, and the pulse circuit obtains the trigger pulse signal according to the pre-turning on signal of the main switch transistor. That is, in this embodiment, the trigger pulse signal is generated by the secondary edge control circuit. Preferably, within the valid time period of the trigger pulse signal, the synchronous rectifying switch transistor is controlled to conduct, and the valid time period of the trigger pulse signal is the third time period; the primary edge control module controls the turning-on and -off of the main switch transistor when the trigger pulse signal is in the valid state. In this example, the isolation module is one of an isolation module, an isolation optocoupler, or an isolation capacitor.

Further, in the above two examples, the primary edge control module controls the auxiliary switch transistor to conduct at the second time period, and the primary edge control module transmits the work instructions to control the synchronous rectifying switch transistor through the isolation module, to make the synchronous rectifying switch transistor to conduct simultaneously at the second time period. That is, the primary edge control module generates switch control instructions to control the synchronous rectifying switch transistor according to the switch transistor of the auxiliary switch transistor. For example, the primary edge control module generates the instructions to control the synchronous rectifying switch transistor according to the conduction state of the auxiliary switch transistor, and it may also transmit it to the secondary edge through the isolation module, and the secondary edge makes the synchronous rectifying switch transistor to conduct simultaneously at the second time period according to the instructions, to ensure the successful conduction of the two switch transistors at the continuous flow stage. In this way, since the signals of the two switch transistors are both generated at the primary edge, it is convenient for the primary edge to obtain the signals, which makes the secondary edge control be further simplified.

Figure 5:
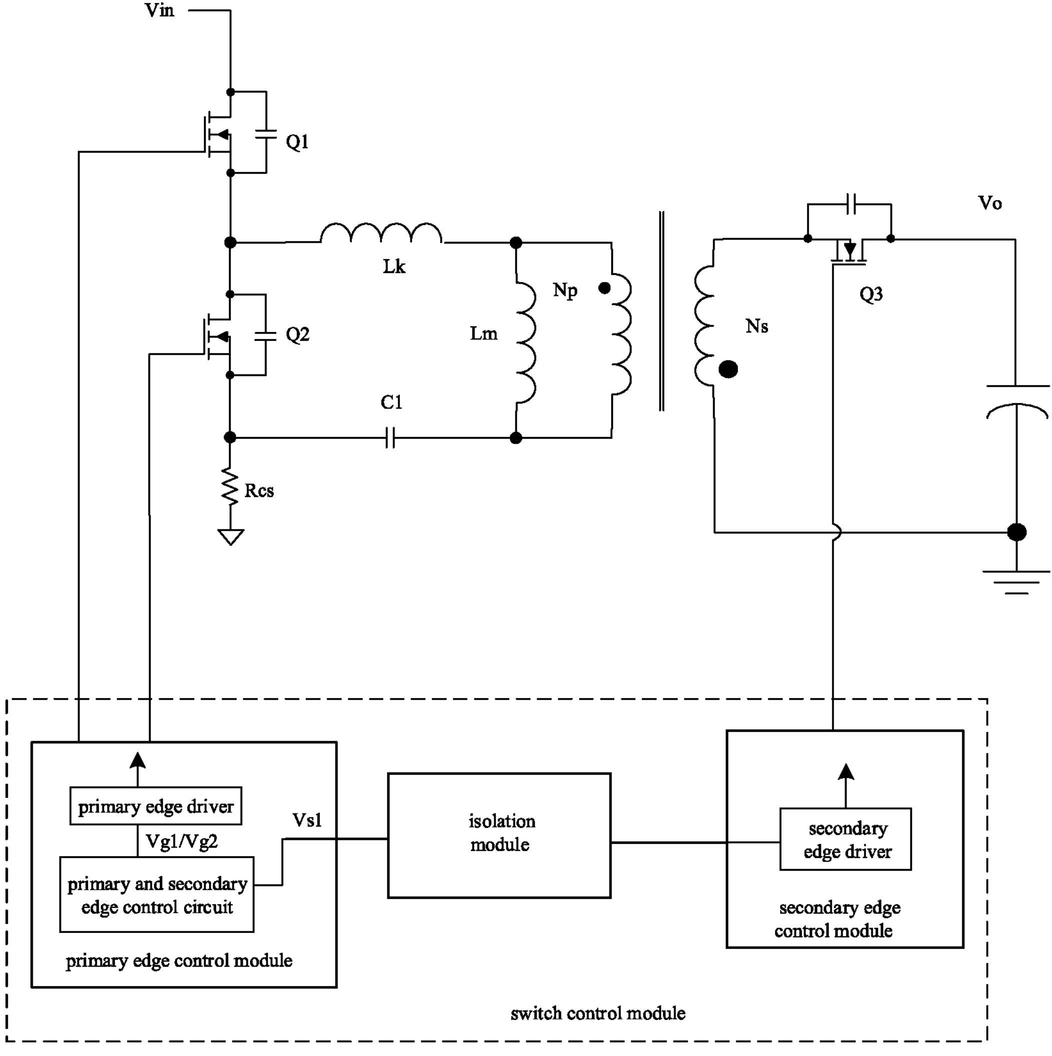
FIG. 5 is a circuit diagram of a second embodiment of the switch control module of the flyback converter of the present invention.

Refer to FIG. 5, it is a circuit diagram of the second embodiment of the switch control module of the flyback converter of the present invention; in this embodiment, the primary edge control module comprise a primary and secondary edge control circuit and a primary edge driver, and the primary and secondary edge control circuit generates switch control signals, e.g., Vg1/Vg2, of the main switch transistor and the auxiliary switch transistor, and switch control signal Vg3 of the synchronous rectifying switch transistor; the primary edge driver drives the turning-on and -off of the main switch transistor and the auxiliary switch transistor according to the switch control signals of the main switch transistor and the auxiliary switch transistor respectively; the secondary edge control module comprises a secondary edge driver, and the primary and secondary edge control circuit transmits the switch control of the synchronous rectifying switch transistor to the secondary edge driver through the isolation module, and the secondary edge driver drives the turning-on and -off of the synchronous rectifying switch transistor according to the switch control signal of the synchronous rectifying switch transistor; the primary and secondary control circuit comprises a pulse circuit, and the pulse circuit transmits the generated trigger pulse signal to the isolation module. The secondary edge driver receives the signal transmitted by the isolation module to control the synchronous rectifying switch transistor to conduct at the third time period. In this example, the switch control signal of the secondary edge rectifying switch transistor is generated by the original primary and secondary edge control circuit, here the switch control signal of the synchronous rectifying switch transistor may be a logic signal; the secondary edge merely comprises a driver, by which the processing of signal is greatly optimized, and the secondary edge control is simple. It should be noted that the pulse circuit in this example may be implemented by the prior art single pulse generation circuit, and the primary and secondary edge control module in this embodiment also controls the turning-off of the main switch transistor at the third time period; after the secondary edge synchronous rectifying switch transistor is turned off, it controls the main switch transistor to conduct formally according to the pre-turning on signal.

Figure 6:
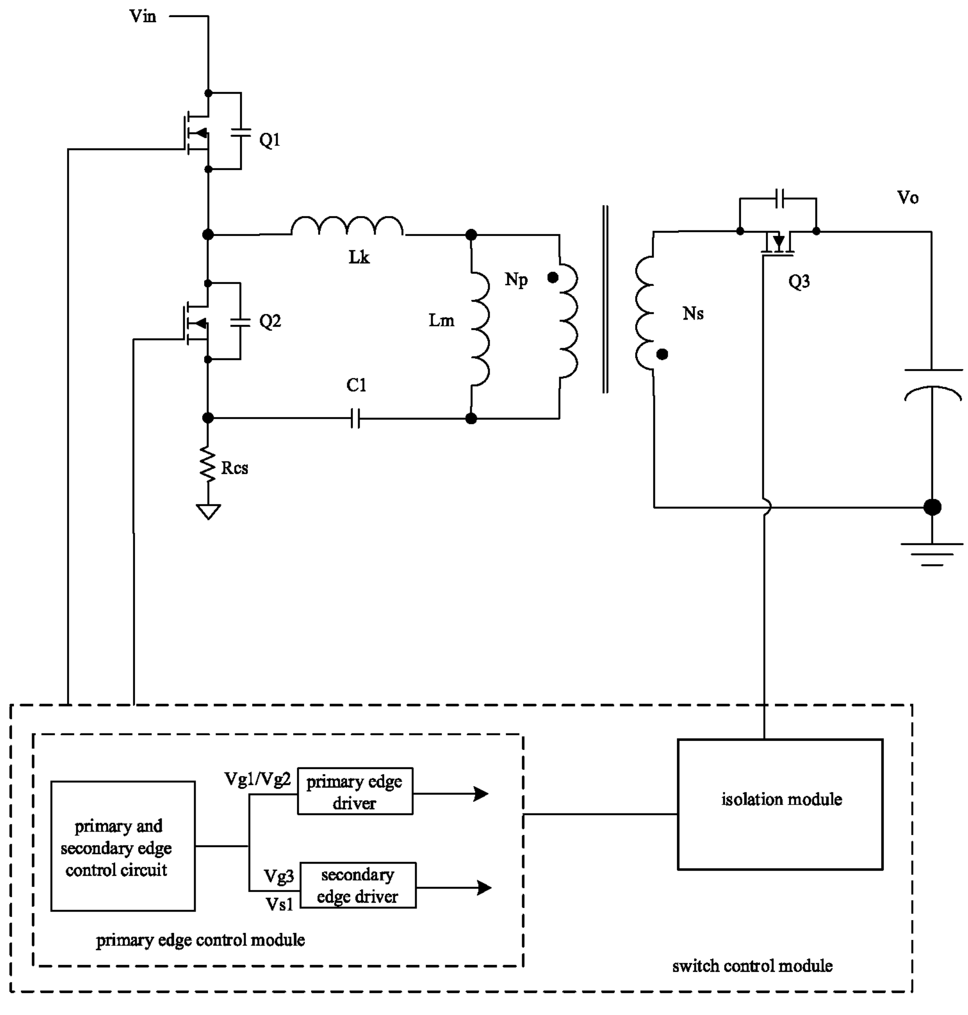
FIG. 6 is a circuit diagram according to a third embodiment of the switch control module of the flyback converter of the present invention.

Refer to FIG. 6, it is a circuit block diagram of the third embodiment of the switch control module of the flyback converter of the present invention; the primary edge control module comprises a primary and secondary edge control circuit, a primary edge controller, and a secondary edge controller; the primary and secondary edge control circuit generates switch control signals Vg1/Vg2 of the main switch transistor and the auxiliary switch transistor, and switch control signal Vg3 of the synchronous rectifying switch transistor; the primary edge driver drives the turning-on and -off of the main switch transistor and the auxiliary switch transistor respectively according to the switch control signal of the main switch transistor and the auxiliary switch transistor respectively; the secondary edge driver generates a driving signal to control the turning-on and -off of the synchronous rectifying switch transistor according to the switch control signal of the synchronous rectifying switch transistor, and the driving signal is transmitted to the control end of the synchronous rectifying switch transistor through the isolation module; the primary and secondary control circuit comprises the pulse circuit, and the secondary edge driver generates a driving signal that the synchronous rectifying switch transistor conducts at the third time period according to the trigger pulse signal, and the isolation module transmits the drive signal to the control end of the synchronous rectifying switch transistor. In this example, the switch drive signal of the secondary edge synchronous rectifying switch transistor is generated by the secondary edge driver in the primary edge control module, i.e., the drive signal of the synchronous rectifying switch transistor already obtained at the primary edge, and the secondary edge merely transmits the signals through the isolation module, so as to realize the control on the synchronous rectifying switch, and this is greatly optimized in signal process, and the secondary edge may save the drive circuit; it merely needs a chip to implement the control drive of the flyback converter overall. It should be noted that the pulse circuit in this example may be implemented by the prior art single pulse generation circuit, and the primary and secondary edge control module in this embodiment can also control the main switch transistor to turn off at the third time period; after the secondary edge synchronous rectifying switch transistor is turned off, it will control the main switch transistor to conduct formally according to the pre-turning on signal.

For the same reason, in the embodiments of FIGS. 5 and 6, the primary edge control module controls the auxiliary switch transistor to conduct simultaneously at the second time period, and the primary edge control module transmits the work instructions to control the synchronous rectifying switch transistor through the isolation module, such that during the continuous flow period, the synchronous rectifying switch transistor conducts synchronously at the second time period. In this way, the switch control information of the secondary synchronous rectifying switch transistor at the second time period and the third time period are both obtained by the primary edge control module, and transmitted by the isolation module, which is convenient in logic control, and greatly reduces the chip design difficulty of the secondary edge.

Figures 9, 10:
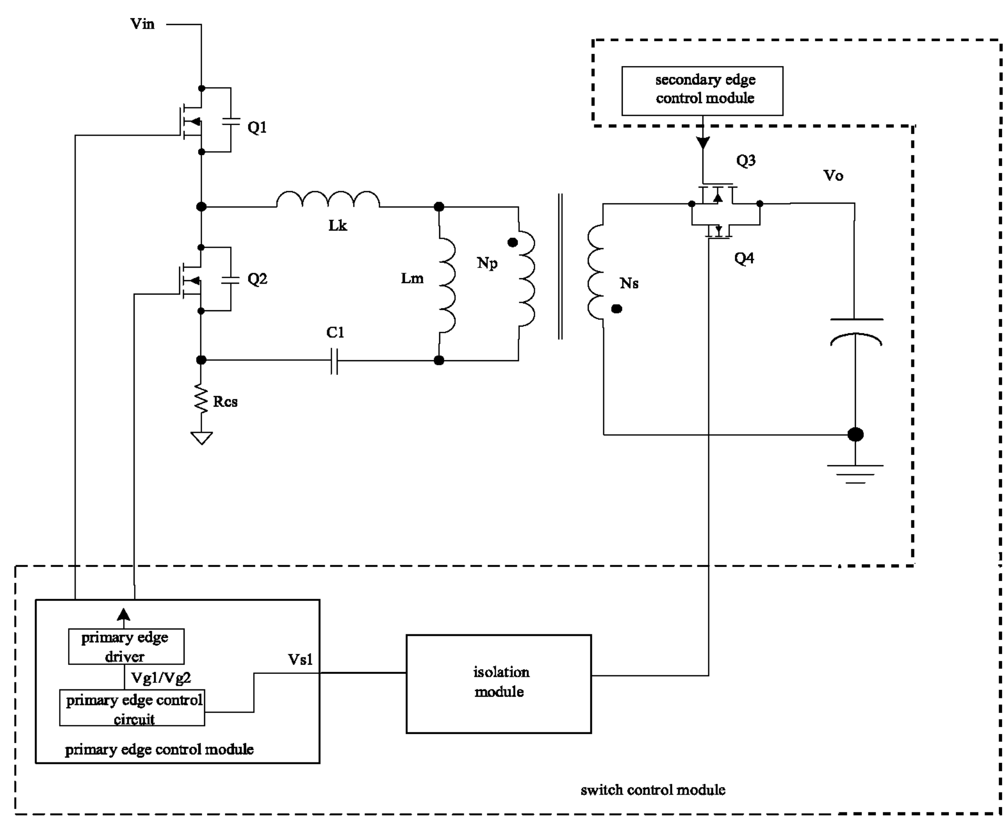
FIG. 9 is a circuit diagram of a fourth embodiment of the switch control module of the flyback converter of the present invention.
FIG. 10 is a work waveform diagram according to the circuit of FIG. 9.

Refer to FIG. 9, it is a circuit block diagram of the fourth embodiment of the switch control module of the flyback converter of the present invention; FIG. 10 is a work waveform of the circuit of FIG. 9. The working principles of the switch control module in this embodiment are similar to those in the above three embodiments, and they differ in that the switch transistor set at the secondary edge circuit in this embodiment is a discharge switch transistor connected to the two ends of the synchronous rectifying switch transistor, e.g., the switch transistor Q4 of FIG. 9. In the embodiment of FIG. 9, the switch control module further comprises a primary edge control module and a secondary edge control module; the primary edge control module comprises a primary edge control circuit and a primary edge driver, and the primary edge control circuit generates the switch control signal of the main switch transistor, and the primary edge driver drives the turning-on and -off of the main switch transistor according to the switch control signal of the main switch transistor; the secondary edge control module comprises a secondary edge driver, and the secondary edge control module generates the switch control signal of the synchronous switch transistor, and the secondary edge driver drives the turning-on and -off of the synchronous rectifying switch transistor according to the switch control signal of the synchronous rectifying switch transistor; the original control circuit comprises the pulse circuit, and the pulse circuit transmits the generated trigger pulse signal to the isolation module. The secondary edge driver controls the discharge switch transistor connected to two ends of the synchronous rectifying switch transistor to conduct at the third time period according to the signal transmitted by the isolation module. Refer to the waveform diagram of FIG. 10, within the time periods of t1-t2 and t5-t6, the discharge switch transistor conducts for a time period, and this can reduce the source-drain voltage of the main switch transistor, to make that before the main switch transistor Q1 is conducted, the source/drain voltage is reduced to zero, so as implement the zero-voltage conduction of the main switch transistor.

Those skilled in the art know that the solution that the switch transistor of the secondary edge circuit may be a synchronous rectifying switch transistor can also be applied in the embodiment that the switch transistor of the secondary edge circuit is the discharge switch transistor connected to the two ends of the synchronous rectifying switch transistor, which is omitted here. In this embodiment, the switch transistor at the secondary edge circuit is the discharge switch transistor connected at the two ends of the synchronous rectifying switch transistor, and this will make the control more flexible, and will not affect the original control of the synchronous rectifying switch transistor; moreover, the discharge switch transistor may use switch transistor of lower voltage withstand, and the consumption is small during the use process, which increases system efficiency.

The switch control module in all of the above embodiments can be an integrated chip, or maybe a plurality of integrated chips; the primary edge control module and the secondary edge control module can be encapsulated in an encapsulation body, or may be encapsulated in a plurality of encapsulation bodies, and this can be selected according to actual conditions.

Figure 7:
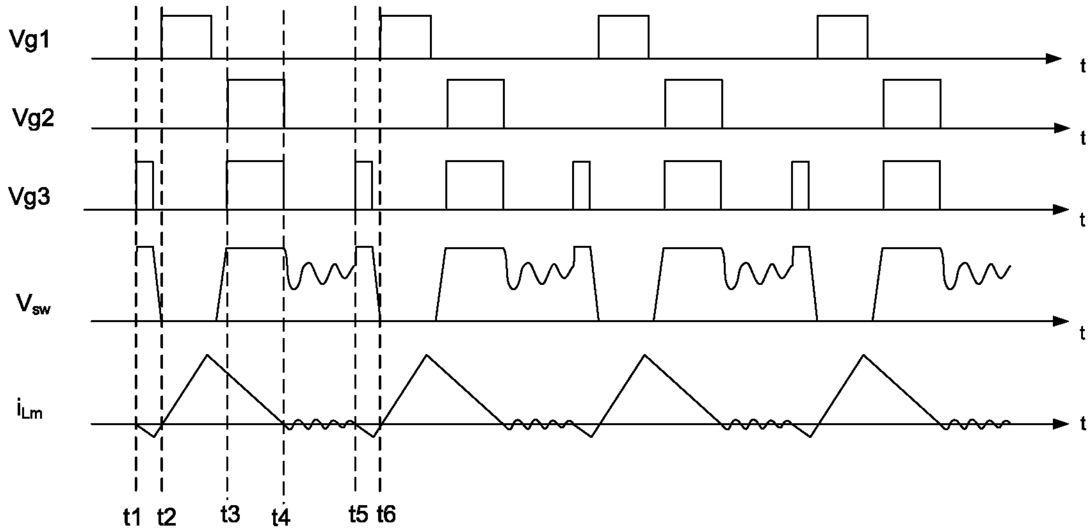
FIG. 7 is a work waveform diagram of the first working mode of the present invention.
Figure 8:
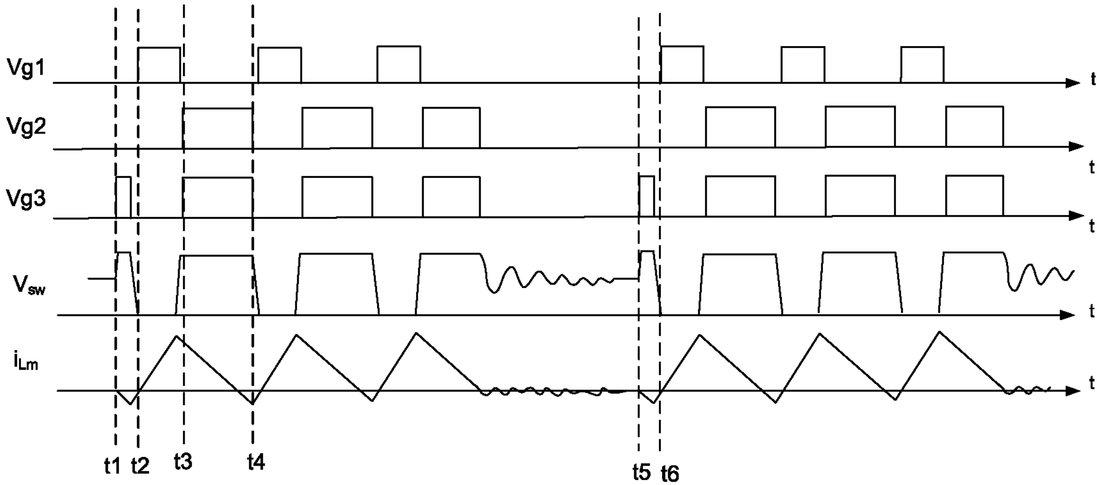
FIG. 8 is a work waveform diagram of the second working mode of the present invention.

Schematically, the operation mode of the flyback converter is controlled at the first mode and the second mode according to the output feedback signal of the switch power supply; a work cycle of the first mode comprises a switch cycle of discontinuous conduction mode, while a work cycle of the second mode comprises N switch cycles of critical mode and a switch cycle of discontinuous conduction mode; if a work cycle of the current first mode enters into the next work cycle or a work cycle of the second mode enters into the next work cycle, the synchronous rectifying switch transistor is conducted for the third time period before the next work cycle starts. Refer to waveform diagrams of FIG. 7 and FIG. 8; FIG. 7 corresponds to the work waveform of the first mode, and FIG. 8 corresponds to the work waveform of the second mode. GON is the switch control signal of the main switch transistor; GAC is a switch control signal of the auxiliary switch transistor; GSR is a switch control signal of the synchronous rectifying switch transistor; Vsw is the voltage information change conditions at the two ends of source and drain of the main switch transistor, and ILM is excitation inductance current. Refer to FIG. 7, working at the first mode is marked as the DCM, and t2-t6 is a switch cycle, then the pre-turning on signal of the main switch transistor is obtained at time t1, and a trigger pulse signal is generated; the synchronous rectifying switch transistor is conducted for a time period according to the trigger pulse signal, e.g., a third time period, and the synchronous rectifying switch transistor is conducted; after the dead time elapses, and when the source drain voltage of the main switch transistor is reduced to zero, the main switch transistor is controlled to conduct at time t2 to realize the zero voltage conduction of the main switch transistor. At the continuous flow time period of t3-t4, the primary edge generates signals to control the auxiliary switch transistor to conduct, and it also generates the signal to control the synchronous rectifying switch transistor to conduct synchronously. Refer to FIG. 8, working at the second mode is also called hiccup working mode, and t2-t6 is a switch cycle. For the same reason, the working principle is similar to FIG. 7; at time t2, the main switch transistor is controlled to conduct to realize the zero-voltage conduction of the main switch transistor.

According to the technical solution of the present invention, it is easy and convenient to obtain the switch signal of the primary edge main switch transistor only by isolated transmitting the primary edge signal through the isolation module, so as to control the synchronous rectifying switch transistor at the auxiliary edge to conduct, to realize the zero voltage conduction of the main switch transistor; moreover, the trigger pulse signal controlling the secondary edge synchronous rectifying switch transistor to conduct may be obtained at the primary edge or obtained at the secondary edge, and it is flexible to control; controlling the switch transistor connected at the secondary edge circuit to conduct for a small period of time can reduce system consumption to the maximum degree, so as to enhance efficiency.

In an embodiment, the main switch transistor and the auxiliary switch transistor are sequentially connected in series between the input terminal and the reference ground of the flyback converter, or the auxiliary switch transistor and the main switch transistor are sequentially connected in series between the input terminal and the reference ground of the flyback converter.

In an embodiment, the flyback converter further comprises a first capacitor; the first capacitor, the auxiliary switch transistor, and the main switch transistor are sequentially connected in series between the input terminal and the reference ground of the flyback converter. The control manner of the present invention may also reduce the source-drain voltage of the main switch transistor of the flyback converter of the active clamp, so as to reduce the conduction consumption of the switch transistor, and enhance system efficiency.

The control methods of the above embodiments can be applied in the normal flyback converter, and the primary edge of the flyback converter comprises the main switch transistor, and the soft switch control circuit only controls the main switch transistor to conduct at the first time period;

the control time of the main switch transistor and the control time of the synchronous rectifying switch transistor are both the same as those in the above embodiments, which are omitted here.

The above embodiments do not form restriction on the protection scope of the technical solution. Any amendments, equivalent replacements, and improvements made within the sprits and scopes of the above embodiments shall fall in the protection scopes of the technical solutions.

What is claimed is:

1. A soft switch control circuit of a flyback converter, the flyback converter comprising a primary edge part and a secondary edge part;

wherein the primary edge part comprises a main switch transistor, and the secondary edge part comprises a synchronous rectifying switch transistor, wherein the soft switch control circuit comprises:

a switch control module, for controlling the main switch transistor to conduct at a first time period and the synchronous rectifying switch transistor to conduct at a second time period, and for controlling a switch transistor set at a secondary edge circuit to conduct at a third time period, the third time period being after the second time period and before the first time period, wherein the switch control module comprises a primary edge control module, and the primary edge control module obtains a trigger pulse signal according to a pre-turning on signal of the main switch transistor, and the trigger pulse signal is transmitted to the secondary edge part by an isolation module, to control the switch transistor of the secondary edge circuit to conduct at the third time period.

2. The soft switch control circuit of the flyback converter of claim 1, wherein the primary edge control module comprises a pulse circuit, the pulse circuit obtains the trigger pulse signal according to the pre-turning on signal of the main switch transistor.

3. The soft switch control circuit of the flyback converter of claim 2, wherein the primary edge control module further comprises a conduction delay circuit, the conduction delay circuit is connected to the pulse circuit so as to control the main switch transistor to turn off within the third time period such that the switch transistor of the secondary edge circuit is conducted.

4. The soft switch control circuit of the flyback converter of claim 2, wherein the switch control module is configured to control the synchronous rectifying switch transistor or a discharge switch transistor connected to two ends of the synchronous rectifying switch transistor to conduct at the third time period.

5. The soft switch control circuit of the flyback converter of claim 4, wherein the switch control module further comprises a secondary edge control module, the primary edge control module comprises a primary edge control circuit and a primary edge driver, the primary edge control circuit generates a switch control signal of the main switch transistor, and the primary edge driver drives the main switch transistor to turn on/off according to the switch control signal of the main switch transistor;

the secondary edge control module comprises a secondary edge control circuit and a secondary edge driver, the secondary edge control circuit generates a switch control signal of the synchronous rectifying switch transistor, and the secondary edge driver drives the synchronous rectifying switch transistor to turn on/off according to the switch control signal of the synchronous rectifying switch transistor;

the pulse circuit transmits the trigger pulse signal to the isolation module, and the secondary edge control circuit receives the trigger pulse signal transmitted by the isolation module, to control the synchronous rectifying switch transistor or the discharge switch transistor connected at two ends of the synchronous rectifying switch transistor to conduct at the third time period.

6. The soft switch control circuit of the flyback converter of claim 4, wherein the switch control module further comprises a secondary edge control module, the primary edge control module comprises a primary and secondary edge control circuit and a primary edge driver, the primary and secondary edge control circuit generating a switch control signal of the main switch transistor and a switch control signal of the synchronous rectifying switch transistor, the primary edge driver drives the main switch transistor to turn on/off according to the switch control signal of the main switch transistor;

the secondary edge control module comprises a secondary edge driver; the primary and secondary edge control circuit transmits the switch control signal of the synchronous rectifying switch transistor to the secondary edge driver by the isolation module, and the secondary edge driver drives the synchronous rectifying switch transistor to turn on/off according to the switch control signal of the synchronous rectifying switch transistor;

the pulse circuit transmits the generated pulse trigger signal to the isolation module; the secondary edge driver receives the trigger pulse signal transmitted by the isolation module, to control the synchronous rectifying switch transistor or the discharge switch transistor connected at two ends of the synchronous rectifying switch transistor to conduct at the third time period.

7. The soft switch control circuit of the flyback converter of claim 1, wherein the isolation module is one of an isolation transformer, an isolation optocoupler, or an isolation capacitor.

8. The soft switch control circuit of the flyback converter of claim 1, wherein in the flyback converter, a transformer is formed of a primary edge winding and a secondary edge winding, the primary edge part comprises the primary edge winding and the secondary edge part comprises the secondary edge winding, the transformer is used for isolation.

9. The soft switch control circuit of the flyback converter of claim 1, wherein during a valid time period of the trigger pulse signal, controlling the switch transistor of the secondary edge circuit to conduct, the valid time period of the trigger pulse signal being the third time period.

10. The soft switch control circuit of the flyback converter of claim 1, wherein a duration of the third time period is a preset value associated with the input voltage or the output voltage, or is self-adapted according to whether the main switch transistor is conducted when a source-drain voltage is zero.

11. The soft switch control circuit of the flyback converter of claim 1, wherein the primary edge part further comprises an auxiliary switch transistor, the auxiliary switch transistor being connected to the main switch transistor, the switch control module is for controlling both the auxiliary switch transistor and the synchronous rectifying switch transistor to conduct at the second time period.

12. The soft switch control circuit of the flyback converter of claim 11, wherein the primary edge control module controls the auxiliary switch transistor to conduct at the second time period, and the primary edge control module transmits work instructions to control the synchronous rectifying switch transistor by the isolation module, to control the synchronous rectifying switch transistor to conduct synchronously at the second time period.

13. A soft switch control circuit of a flyback converter, the flyback converter comprising a primary edge part and a secondary edge part;

wherein the primary edge part comprises a main switch transistor, and the secondary edge part comprises a synchronous rectifying switch transistor, wherein the soft switch control circuit comprises:

a switch control module, for controlling the main switch transistor to conduct at a first time period and the synchronous rectifying switch transistor to conduct at a second time period, and controlling a switch transistor set at a secondary edge circuit to conduct at a third time period, the third time period being after the second time period and before the first time period, wherein the switch control module comprises a primary edge control module and a secondary edge control module, the primary edge control module generates a pre-turning on signal to control the main switch transistor to turn on, and the pre-turning on signal is transmitted to the secondary edge control module by an isolation module; the secondary edge control module obtains a trigger pulse signal according to the pre-turning on signal of the main switch transistor, to control the switch transistor of the secondary edge circuit to conduct at the third time period.

14. The soft switch control circuit of the flyback converter of claim 13, wherein the secondary edge control module comprises a pulse circuit, the pulse circuit obtains the trigger pulse signal according to the pre-turning on signal of the main switch transistor.

15. The soft switch control circuit of the flyback converter of claim 13, wherein, the isolation module is one of an isolation transformer, an isolation optocoupler, or an isolation capacitor.

16. The soft switch control circuit of the flyback converter of claim 13, wherein, the synchronous rectifying switch transistor is controlled to conduct within a valid time period of the trigger pulse signal, the valid time of the trigger pulse signal being the third time period;

the primary edge control module controls the main switch transistor to turn off when the trigger pulse signal is in a valid state.

17. The soft switch control circuit of the flyback converter of claim 13, wherein the switch control module is configured to control the synchronous rectifying switch transistor or a discharge switch transistor connected at two ends of the synchronous rectifying switch transistor to conduct at a third time period.

18. The soft switch control circuit of the flyback converter of claim 17, wherein, the primary edge control module comprises a primary edge control circuit and a primary edge driver, the primary edge control circuit generates a switch control signal of the main switch transistor, and the primary edge driver drives the main switch transistor to turn on/off according to the switch control signal of the main switch transistor;

the secondary edge control module comprises a secondary edge control circuit and a secondary edge driver, the secondary edge control circuit generating a switch control signal of the synchronous rectifying switch transistor, the secondary edge driver driving the synchronous rectifying switch transistor to turn on/off according to the switch control signal of the synchronous rectifying switch transistor;

the secondary edge control circuit comprises the pulse signal, the pulse circuit receiving the pre-turning on signal transmitted by the isolation module, to generate the trigger pulse signal to control the synchronous rectifying switch transistor or the discharge switch transistor connected at two ends of the synchronous rectifying switch transistor to conduct at the third time period.

19. The soft switch control circuit of the flyback converter of claim 13, wherein the primary edge part further comprises an auxiliary switch transistor, the auxiliary switch transistor being connected to the main switch transistor, the switch control module is for controlling both the auxiliary switch transistor and the synchronous rectifying switch transistor to conduct at the second time period.

20. The soft switch control circuit of the flyback converter of claim 19, wherein comprising:

the primary edge control module controls the auxiliary switch transistor to conduct at the second time period, and the primary edge control module transmits work instructions to control the synchronous rectifying switch transistor by the isolation module, to control the synchronous rectifying switch transistor to conduct synchronously at the second time period.

21. A soft switch control circuit of a flyback converter, the flyback converter comprising a primary edge part and a secondary edge part, the primary edge part comprising a main switch transistor, the secondary edge part comprising a synchronous rectifying switch transistor, wherein the soft switch control circuit comprises:

a switch control module, for controlling the main switch transistor to conduct at a first time period and the synchronous rectifying switch transistor to conduct at a second time period, and controlling a switch transistor set at a secondary edge circuit to conduct at a third time period, the third time period being after the second time period and before the first time period, wherein the switch control module comprises a primary edge control module, the primary edge control module obtains a driving signal to drive the switch transistor at the secondary edge circuit according to a pre-turning on signal of the main switch transistor, and the driving signal is transmitted to the secondary edge part by an isolation module to control the switch transistor of the secondary edge circuit to conduct at the third time period.

22. The soft switch control circuit of the flyback converter of claim 21, wherein the primary edge control module comprises a pulse circuit and a secondary edge driver, the pulse circuit obtains a trigger pulse signal according to the pre-turning on signal of the main switch transistor, and the secondary edge driver obtains a drive signal to drive the switch transistor of the secondary edge circuit according to the trigger pulse signal.

23. The soft switch control circuit of the flyback converter of claim 21, wherein the isolation module is one of an isolation transformer, an isolation optocoupler, or an isolation capacitor.

24. The soft switch control circuit of the flyback converter of claim 21, wherein the primary edge part further comprises an auxiliary switch transistor, and the auxiliary switch transistor is connected to the main switch transistor, the switch control module is for controlling both the auxiliary switch transistor and the synchronous rectifying switch transistor to conduct at the second time period.

25. The soft switch control circuit of the flyback converter of claim 24, wherein the primary edge control module controls the auxiliary switch transistor to conduct at the second time period, and primary edge control module transmits a work instruction to control the synchronous rectifying switch transistor by the isolation module, to control the synchronous rectifying switch transistor to conduct synchronously at the second time period.

26. A flyback converter, the flyback converter comprising a primary edge part and a secondary edge part, the primary edge part comprising a main switch transistor and the secondary edge part comprising a synchronous rectifying switch transistor, wherein the flyback converter further comprises: a soft switch control circuit for controlling a switch state of the main switch transistor and the synchronous rectifying switch transistor, wherein the soft switch control circuit comprises:

a switch control module, for controlling the main switch transistor to conduct at a first time period and the synchronous rectifying switch transistor to conduct at a second time period, and for controlling a switch transistor set at a secondary edge circuit to conduct at a third time period, the third time period being after the second time period and before the first time period, wherein the switch control module comprises a primary edge control module, and the primary edge control module obtains a trigger pulse signal according to a pre-turning on signal of the main switch transistor, and the trigger pulse signal is transmitted to the secondary edge part by an isolation module, to control the switch transistor of the secondary edge circuit to conduct at the third time period.

* * * * *